US011428193B2

(12) United States Patent
Ehlert et al.

(10) Patent No.: US 11,428,193 B2
(45) Date of Patent: Aug. 30, 2022

(54) THERMAL INSULATION OF A MEMBRANE MODULE FOR MITIGATING EVAPORATIVE FUEL EMISSIONS OF AUTOMOBILES

(71) Applicant: MAHLE International GmbH, Stuttgart (DE)

(72) Inventors: Thomas Ehlert, Böblingen (DE); Achim Gommel, Weil der Stadt (DE); Melanie Volz, Königsbach (DE); John Jackson, Oxford, MI (US); Simon Streng, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 197 days.

(21) Appl. No.: 16/707,099

(22) Filed: Dec. 9, 2019

(65) Prior Publication Data

US 2021/0172401 A1    Jun. 10, 2021

(51) Int. Cl.
| | |
|---|---|
| *F02M 1/00* | (2006.01) |
| *F02M 25/08* | (2006.01) |
| *B60K 15/03* | (2006.01) |
| *B01D 53/22* | (2006.01) |
| *B01D 53/04* | (2006.01) |

(52) U.S. Cl.
CPC ......... *F02M 25/0854* (2013.01); *B01D 53/04* (2013.01); *B01D 53/229* (2013.01); *B60K 15/03* (2013.01); *B01D 2253/102* (2013.01); *B01D 2257/702* (2013.01); *B01D 2259/40086* (2013.01); *B01D 2259/4516* (2013.01)

(58) Field of Classification Search
CPC ........... F02M 25/0836; F02M 25/0872; F02M 25/0854; F02M 33/02; F02D 41/0032
USPC ................................ 123/516–520, 549, 557
See application file for complete search history.

(56) References Cited

U.S. PATENT DOCUMENTS

| | | | | |
|---|---|---|---|---|
| 2,283,736 | A * | 5/1942 | Jackson | H01H 71/7409 337/48 |
| 5,957,113 | A | 9/1999 | Masaki et al. | |
| 6,279,548 | B1 * | 8/2001 | Reddy | B01D 53/02 123/519 |
| 6,772,740 | B2 | 8/2004 | Kojima et al. | |
| 7,261,092 | B1 | 8/2007 | Oku et al. | |
| 9,732,649 | B2 | 8/2017 | Hiltzik et al. | |
| 2002/0174857 | A1 * | 11/2002 | Reddy | F02M 25/0854 123/520 |
| 2003/0080307 | A1 * | 5/2003 | Jackson | B05C 5/0258 251/205 |
| 2011/0100337 | A1 * | 5/2011 | Orth | F02M 25/0872 123/519 |
| 2011/0303197 | A1 * | 12/2011 | Chung | F02M 33/02 123/518 |

* cited by examiner

*Primary Examiner* — John Kwon
(74) *Attorney, Agent, or Firm* — Dickinson Wright PLLC

(57) ABSTRACT

A thermal insulation system for mitigating evaporative fuel emissions of an automobile may include a membrane component and a thermal component connected to the membrane component. The thermal component may be configured for condensing, in the membrane component or in the thermal component, fuel vapor generated from a fuel tank of an automobile.

19 Claims, 2 Drawing Sheets

THERMAL INSULATION OF A MEMBRANE MODULE FOR MITIGATING EVAPORATIVE FUEL EMISSIONS OF AUTOMOBILES

TECHNICAL FIELD

The present disclosure relates to a thermal insulation system for mitigating evaporative fuel emissions of automobiles, and in particular, a thermal insulation system for fuel vapor emissions caused by an increase in temperature.

BACKGROUND

Evaporation of gasoline fuel from motor vehicle fuel systems is a major potential source of hydrocarbon air pollution. An increase in environmental concerns has continued to drive strict regulations of the hydrocarbon emissions from motor vehicles even when the vehicles are not operating.

SUMMARY OF THE INVENTION

One general aspect of the present disclosure includes a thermal insulation system for mitigating evaporative fuel emissions of an automobile, including a membrane component, and a thermal component connected to the membrane component, where the thermal component is configured for condensing fuel vapor generated from a fuel tank of an automobile. Due to the condensation of the fuel vapor, a smaller amount of fuel vapor will need to be adsorbed by a carbon canister (when a carbon canister is included in the automobile) and a smaller amount of fuel vapor will need to be separated by the membrane component, thereby reducing the number of the carbon canisters and the membrane components and reducing the dimension of the carbon canister and the membrane component needed to effectively reduce the fuel vapor emissions even in a surrounding environment with a high temperature.

Other systems, methods, features and advantages of the invention will be, or will become, apparent to one with skill in the art upon examination of the following figures and detailed description. It is intended that all such additional systems, methods, features, and advantages be within the scope of the invention, and be encompassed by the following claims.

BRIEF DESCRIPTION OF THE DRAWINGS

The present disclosure can be better understood with reference to the following drawings and description. The components in the figures are not necessarily to scale, emphasis instead being placed upon illustrating the principles of the present disclosure. Moreover, in the figures, like-referenced numerals designate corresponding parts throughout the different views.

DETAILED DESCRIPTION

Figure 1:
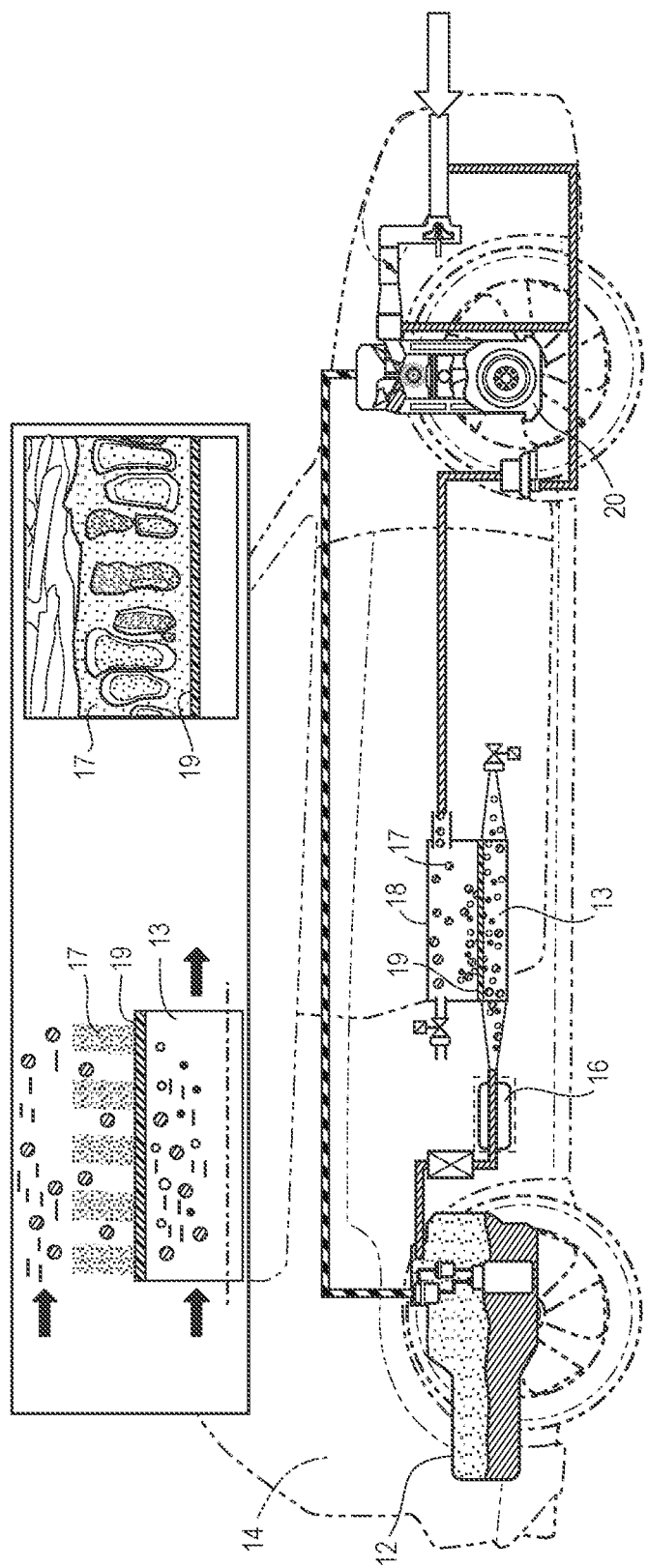
FIG. 1 is an illustration showing a diagrammatic cut-away view of an embodiment of an automobile including a fuel tank connected to a carbon canister and a membrane component in accordance with certain aspects of the present disclosure.

Various aspects are described below with reference to the drawings in which like elements generally are identified by like numerals. The relationship and functioning of the various elements of the aspects may better be understood by reference to the following detailed description. However, aspects are not limited to those illustrated in the drawings or explicitly described below. It also should be understood that the drawings are not necessarily to scale, and in certain instances details may have been omitted that are not necessary for an understanding of aspects disclosed herein, such as conventional material, construction, and assembly.

Figure 2:
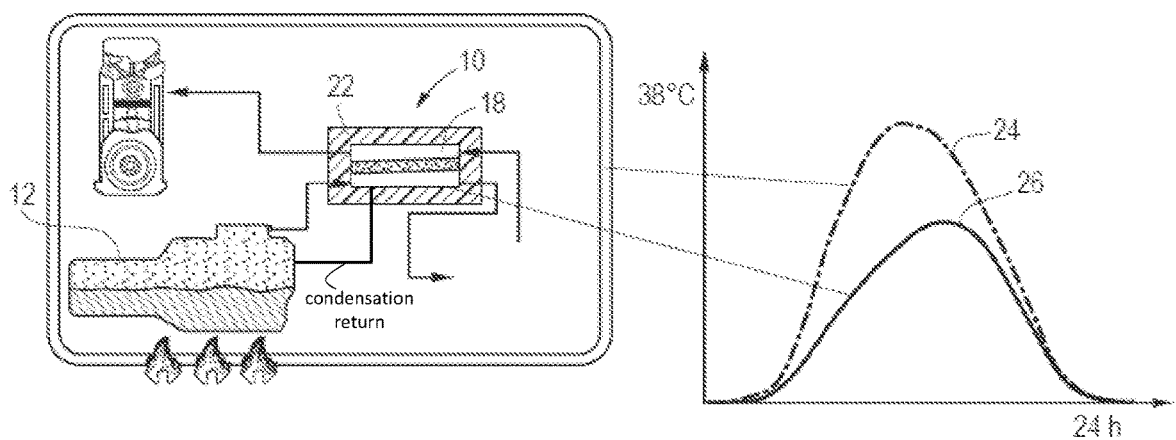
FIG. 2 is a an illustration showing a diagrammatic view of an embodiment of a thermal insulation system connected to a fuel tank in accordance with certain aspects of the present disclosure.
Figure 3:
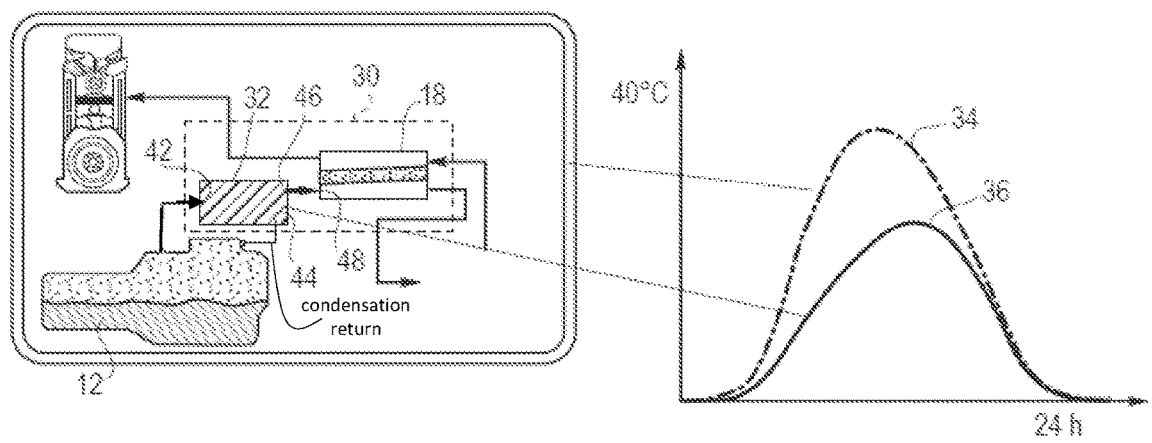
FIG. 3 is a an illustration showing a diagrammatic view of another embodiment of a thermal insulation system connected to a fuel tank in accordance with certain aspects of the present disclosure.

A thermal insulation system used for mitigating evaporative fuel emissions of an automobile (e.g., as shown in FIG. 1) is shown in FIGS. 2 and 3. For the sake of brevity, the thermal insulation system disclosed herein is described and depicted to be used with an automobile, one of ordinary skill in the art, with a thorough review of the subject specification and figures will readily comprehend how the thermal insulation system may be used with other vehicles, such as motorcycles, for mitigating evaporative fuel emissions thereof, and will readily comprehend which other vehicles might be suitable without undue experimentation.

Referring to FIG. 1, a fuel tank 12 of an automobile 14 is connected to a carbon canister 16, where the carbon canister 16 is configured for adsorbing at least a portion of a fuel vapor generated from the fuel tank 12. In a conventional carbon canister system, the fuel vapor is stored in the carbon canister till a combustion engine 20 generates enough pressure inside the intake manifold to purge the activated carbon using ambient air. That is, when the combustion engine 20 is turned on, the carbon canister 16 will be cleaned and the fuel vapor adsorbed by the carbon canister 16 will be directly transported to the combustion engine 20 to be burned, thereby reducing the fuel vapor emissions. A membrane component 18 is connected downstream of the carbon canister 16, such that the fuel vapor flowing from the carbon canister 16 (e.g., that is not adsorbed by the carbon canister) will flow into the membrane component 18. In some embodiments, the membrane component 18 may be connected upstream of the carbon canister 16, depending on the overall layout. The membrane component 18 is configured for separating the fuel vapor into a first gas with a high concentration of hydrocarbons and a second gas with a high concentration of inert air components (e.g., oxygen, nitrogen). The first gas is directed to the combustion engine 20 to be burned, thereby reducing the fuel vapor (e.g., with a high concentration of hydrocarbons) emissions. In some embodiments, as shown in FIG. 2, the membrane component 18 is directly connected to the fuel tank 12, where the membrane component 18 is configured for receiving and separating at least a portion of the fuel vapor generated from the fuel tank 12.

As shown in FIG. 1, the membrane component 18 includes a separating layer 19 disposed in the membrane component 18 such that the membrane component 18 is divided into a lower compartment 13 and an upper compartment 17. The separating layer 19 is configured for separating the fuel vapor that flows into the lower compartment 13 by selectively allowing passage of the hydrocarbons while blocking passage of inert air components (e.g., oxygen and nitrogen). That is, the separating layer 19 is configured such that the permeability of the hydrocarbons is higher than the inert air components (e.g., oxygen and nitrogen), which allows the hydrocarbons included in the fuel vapor to flow from the lower compartment 13, through the separating layer 19, and into the upper compartment 17, while preventing the inert air components (e.g., oxygen and nitrogen) from flowing into the upper compartment 17. The separating layer 19 may include silicone or other suitable materials.

In the embodiment as shown in FIG. 1, as the temperature in the surrounding environment of the automobile 14 increases, the fuel vapor generated in the fuel tank 12 also increases, which flows from the fuel tank 12 into the carbon canister and then flows into the membrane component 18. Accordingly, to mitigate the fuel vapor emissions when the temperature of the surrounding environment increases, a greater number of the carbon canisters and the membrane components may be needed. Additionally or alternatively, a greater dimension (e.g., volume, surface area) of the carbon canister and the membrane component may be needed. The thermal insulation system disclosed herein provides the ability to achieve a constant fuel vapor emission without the need for a greater number of the carbon canisters and the membrane components or a greater dimension of the carbon canister and the membrane component to be used when the temperature of the surrounding environment increases. The thermal insulation system disclosed herein also provides the ability to achieve lower fuel vapor emissions without the need for increasing the number of the carbon canisters and the membrane components or increasing the dimension of the carbon canister and the membrane component. The thermal insulation system disclosed herein is also advantageous for increasing the space utilization rate and saving packaging related costs.

The thermal insulation system (10 as shown in FIG. 2 or 30 as shown in FIG. 3) disclosed herein includes a membrane component 18 and a thermal component (22 as shown in FIG. 2 or 32 as shown in FIG. 3) connected to the membrane component 18. The thermal component is configured for condensing fuel vapor generated from a fuel tank 12 of an automobile 14, such that a smaller amount of fuel vapor needs to be adsorbed by the carbon canister 16 (when the carbon canister is included in the automobile) and a smaller amount of fuel vapor needs to be separated by the membrane component 18, thereby reducing the number of the carbon canisters 16 and the membrane components 18 and reducing the dimension of the carbon canister 16 and the membrane component 18 needed to effectively reduce the fuel vapor emissions even in a surrounding environment with a high temperature.

Referring to FIG. 2, a first embodiment of the thermal insulation system 10 is shown. While the thermal insulation system 10 is shown to be directly connected downstream to the fuel tank 12, it will be appreciated that the whole system shown in FIG. 2 may be modified to include one or more carbon canisters connected between the fuel tank 12 and the thermal insulation system 10, disposed downstream of the fuel tank 12 and upstream of the thermal insulation system 10 for adsorbing at least a portion of the fuel vapor flowing out of the fuel tank 12.

As shown in FIG. 2, the thermal insulation system 10 includes a thermal component 22 connected to a membrane component 18 (e.g., the thermal component 22 is disposed around the membrane component 18), such that a membrane component temperature change 26 (e.g., temperature increase) of the membrane component 18 is slower than an environment temperature change 24 (e.g., temperature increase) of a surrounding environment (e.g., an environment where the fuel tank 12 and the thermal insulation system 10 are placed in). For example, as shown in FIG. 2, taking the temperature change within 24 hours as an example, the temperature of the surrounding environment goes up in a first period (e.g., first 12 hours) and then go down in a second period (e.g., the next 12 hours). As the temperature of the surrounding environment goes up, the membrane component 18 is delayed in the increase of the temperature, such that the temperature of the membrane component 18 is always lower than the temperature of the surrounding environment. In some embodiments, the thermal insulation system 10 may be coupled to a cooling device (e.g., HVAC system) to further lower the temperature of the membrane component 18, which facilitates the condensation of the fuel vapor in the membrane component 18, as discussed in greater detail below. As the temperature of the surrounding environment goes down in the second period, the temperature of the membrane component 18 will also go down. Even though the membrane component 18 is delayed in the decrease of the temperature, the highest temperature of the membrane component 18 is lower than the highest temperature of the surrounding environment, and the temperature of the membrane component 18 is always lower than the temperature of the surrounding environment.

In use, as shown in FIG. 2, as the temperature of the surrounding environment goes up (e.g., the environment temperature change 24), the temperature of the fuel tank 12 goes up correspondingly, such that fuel vapor is generated, due to the temperature increase of the surrounding environment (e.g., the environment temperature change 24), in the fuel tank 12, flow out of the fuel tank 12, and into the membrane component 18. That is, at least a portion of the fuel vapor received in the membrane component 18 is generated from the fuel tank 12 due to the temperature increase of the surrounding environment (e.g., the environment temperature change 24). As the temperature of the membrane component 18 is always lower than the temperature of the surrounding environment, as discussed above, at least a portion of the fuel vapor received in the membrane component 18 is condensed in the membrane component 18 due to the lower temperature in the membrane component 18. In some embodiments, the condensed fuel vapor is directed back to the fuel tank 12 in liquid form, thereby mitigating the fuel vapor emissions.

Due to the condensation of at least a portion of the fuel vapor received in the membrane component 18, a smaller number of the membrane components 18 or a smaller dimension (e.g., volume, surface area) of the membrane component 18 is needed to achieve a desirable fuel vapor emission. It will be appreciated that with the same number of the membrane components 18 and the same dimension (e.g., volume, surface area) of the membrane component 18, by connecting the thermal component 22 to the membrane component 18, a desirable fuel vapor emission is achieved even when a greater amount of fuel vapor is generated in the fuel tank 12.

The thermal component 22 may include any suitable configuration and material such that the membrane component 18 connected to the thermal component 22 is delayed in the temperature change in response to the temperature change of the surrounding environment. In some embodiments, the thermal component 22 may include a vacuum thermal insulating material that is configured to be disposed around the membrane component 18, such that the membrane component 18 is enveloped by the vacuum thermal insulating material. In some embodiments, the thermal component 22 may include an insulating ceramic material that is configured to be applied to the outer surface of the membrane component 18 to form a ceramic heat-insulating coating thereon. In some embodiments, the thermal component 22 may include a heat retention material configured to form a passive heat retention enclosure, for receiving the membrane component 18 therein, that retains and re-radiates the heat of the surrounding environment. It will be appreciated that the thermal component 22 may include other suitable materials and configurations not discussed above, without departing from the scope of the present invention, as long as the change of the temperature in the membrane component 18 connected to the thermal component 22 is delayed in response to the temperature change in the surrounding environment.

Referring to FIG. 3, a second embodiment of the thermal insulation system 30 is shown, which includes a thermal component 32 disposed upstream of (e.g., connected upstream to) a membrane component 18. As shown in FIG. 3, the thermal component 32 is connected downstream to a fuel tank 12 and configured for allowing at least a portion of the fuel vapor generated from the fuel tank 12 to flow into the thermal component 32 through a first inlet 42, flow out of the thermal component 32 through a first outlet 46, and then flow into the membrane component 18 through a second inlet 48. While the thermal insulation system 30 is shown to be directly connected downstream to the fuel tank 12, it will be appreciated that the whole system shown in FIG. 3 may be modified to include one or more carbon canisters connected between the fuel tank 12 and the thermal insulation system 30 (e.g., between the fuel tank 12 and the thermal component 32), disposed downstream of the fuel tank 12 and upstream of the thermal insulation system 30 (e.g., disposed upstream of the thermal component 32) for adsorbing at least a portion of the fuel vapor flowing out of the fuel tank 12.

As shown in FIG. 3, the thermal insulation system 30 is configured such that a thermal component temperature change 36 (e.g., temperature increase) of the thermal component 32 is slower than an environment temperature change 34 (e.g., temperature increase) of a surrounding environment (e.g., an environment where the fuel tank 12 and the thermal insulation system 30 are placed in). For example, as shown in FIG. 3, taking the temperature change within 24 hours as an example, the temperature of the surrounding environment goes up in a first period (e.g., first 12 hours) and then go down in a second period (e.g., the next 12 hours). As the temperature of the surrounding environment goes up, the thermal component 32 is delayed in the increase of the temperature, such that the temperature of the thermal component 32 is always lower than the temperature of the surrounding environment. In some embodiments, the thermal component 32 may be coupled to a cooling device (e.g., HVAC system) to further lower the temperature of the thermal component 32, which facilitates the condensation of the fuel vapor in the thermal component 32, as discussed in greater detail below. As the temperature of the surrounding environment goes down in the second period, the temperature of the thermal component 32 will also go down. Even though the thermal component 32 is delayed in the decrease of the temperature, the highest temperature of the thermal component 32 is lower than the highest temperature of the surrounding environment, and the temperature of the thermal component 32 is always lower than the temperature of the surrounding environment.

In use, as shown in FIG. 3, as the temperature of the surrounding environment goes up (e.g., the environment temperature change 34), the temperature of the fuel tank 12 goes up correspondingly, such that fuel vapor is generated, due to the temperature increase of the surrounding environment (e.g., the environment temperature change 34), in the fuel tank 12, flow out of the fuel tank 12, and into the thermal component 32 through the first inlet 42. That is, at least a portion of the fuel vapor flowing into the thermal component 32 is generated from the fuel tank 12 due to the temperature increase of the surrounding environment (e.g., the environment temperature change 34). As the temperature of the thermal component 32 is always lower than the temperature of the surrounding environment, as discussed above, at least a portion of the fuel vapor flowing into the thermal component 32 is condensed in the thermal component 32 due to the lower temperature in the thermal component 32. The condensed fuel vapor flows back to the fuel tank 12 in liquid form through a second outlet 44, thereby mitigating the fuel vapor emissions.

Due to the condensation of at least a portion of the fuel vapor flowing into the thermal component 32, a smaller amount (e.g., reduced by the condensation) of the fuel vapor will flow out of the thermal component 32, and then flow into the membrane component 18, such that a smaller number of the membrane components 18 and a smaller dimension (e.g., volume, surface area) of the membrane component 18 is needed to achieve a desirable fuel vapor emission. It will be appreciated that with the same number of the membrane components 18 and the same dimension (e.g., volume, surface area) of the membrane component 18, by connecting the thermal component 32 upstream to the membrane component 18, a desirable fuel vapor emission is achieved even when a greater amount of fuel vapor is generated in the fuel tank 12.

While the thermal component 32 is shown to be directly connected upstream to the membrane component 18, it will be appreciated that in some embodiments, one or more carbon canisters may be connected between the thermal component 32 and the membrane component 18, disposed downstream of the thermal component 32 and upstream of the membrane component 18. It will be appreciated that in these embodiments, due to the condensation of at least a portion of the fuel vapor flowing into the thermal component 32, a smaller amount (e.g., reduced by the condensation) of the fuel vapor will flow out of the thermal component 32, and then flow into the one or more carbon canisters, such that a smaller number of the carbon canisters and the membrane component 18 and a smaller dimension (e.g., volume, surface area) of the carbon canister and the membrane component 18 is needed to achieve a desirable fuel vapor emission. It will be appreciated that with the same number of the carbon canisters and the membrane components 18 and the same dimension (e.g., volume, surface area) of the carbon canister and the membrane component 18, by connecting the thermal component 32 upstream of the one or more carbon canisters, a desirable fuel vapor emission is achieved even when a greater amount of fuel vapor is generated in the fuel tank 12.

The thermal component 32 may include any suitable configuration and material such that the thermal component 32 is delayed in the temperature change in response to the temperature change of the surrounding environment. In some embodiments, the thermal component 32 may include a chamber with vacuum thermal insulating materials disposed on the outer surface of the chamber, such that the chamber is enveloped by the vacuum thermal insulating materials. In some embodiments, the thermal component 32 may include a chamber with insulating ceramic materials applied to the outer surface of the chamber to form a ceramic heat-insulating coating thereon. In some embodiments, the thermal component 32 may include a chamber with heat retention materials disposed on the outer surface of the chamber, forming a passive heat retention enclosure that retains and re-radiates the heat of the surrounding environment. It will be appreciated that the thermal component 32 may include other suitable materials and configurations not discussed above, without departing from the scope of the present invention, as long as the change of the temperature in the thermal component 32 is delayed in response to the temperature change in the surrounding environment. It will be appreciated that, in some embodiments, the thermal component 32 may be connected to a honeycomb with a limited Butane Working Capacity ("BWC") instead of the membrane component 18 to reduce the amount of the fuel vapor that needs to be adsorbed by the honeycomb, as discussed above with respect to the thermal insulation system 30.

It will be appreciated that the first and second embodiments of the thermal insulation system may be combined in various different ways, as desired or needed, such that the fuel vapor is condensed in both the membrane component and the thermal component, and which may also be combined with various combinations of the positioning of the fuel tank, the thermal component(s), the carbon canister(s), and the membrane component(s), as desired or needed, without departing from the scope of the present invention.

While various embodiments of the present disclosure have been described, the present disclosure is not to be restricted except in light of the attached claims and their equivalents. One skilled in the relevant art will recognize that numerous variations and modifications may be made to the embodiments described above without departing from the scope of the present invention, as defined by the appended claims. Moreover, the advantages described herein are not necessarily the only advantages of the present disclosure and it is not necessarily expected that every embodiment of the present disclosure will achieve all of the advantages described.

We claim:

1. A thermal insulation system for mitigating evaporative fuel emissions of an automobile, comprising:
   a membrane component; and
   a thermal mitigating component connected to the membrane component,
   wherein the thermal insulation system is configured to receive fuel vapor with at least a portion of the fuel vapor being generated by a change in environmental temperature surrounding a fuel tank in the automobile,
   wherein the thermal mitigating component is configured to maintain a temperature that is lower than the environmental temperature, such that at least a portion of the fuel vapor received by the thermal insulation system condenses,
   wherein the condensed fuel vapor is directed back to the fuel tank.

2. The thermal insulation system of claim 1, wherein the membrane component is configured for receiving and separating at least a portion of the fuel vapor generated from the fuel tank.

3. The thermal insulation system of claim 2, wherein the thermal mitigating component is connected to the membrane component such that a membrane component temperature change of the membrane component is slower than the environmental temperature change of the surrounding environment.

4. The thermal insulation system of claim 3, wherein at least a portion of the fuel vapor generated from the fuel tank due to the environment temperature change of the surrounding environment is received by the membrane component.

5. The thermal insulation system of claim 4, wherein the thermal mitigating component is connected to the membrane component such that at least a portion of the fuel vapor received in the membrane component is condensed in the membrane component.

6. The thermal insulation system of claim 3, wherein the thermal mitigating component is disposed around the membrane component.

7. The thermal insulation system of claim 6, wherein the thermal mitigating component includes a vacuum thermal insulating material.

8. The thermal insulation system of claim 6, wherein the thermal mitigating component includes an insulating ceramic material.

9. The thermal insulation system of claim 6, wherein the thermal mitigating component includes a heat retention material.

10. The thermal insulation system of claim 1, wherein at least a portion of the fuel vapor generated from the fuel tank due to the environment temperature change of the surrounding environment is received by the thermal mitigating component.

11. The thermal insulation system of claim 10, wherein the thermal mitigating component is disposed upstream of the membrane component.

12. The thermal insulation system of claim 11, further comprises one or more carbon canisters connected downstream to the thermal mitigating component and connected upstream to the membrane component.

13. The thermal insulation system of claim 11, further comprises one or more carbon canisters connected upstream to the thermal mitigating component.

14. The thermal insulation system of claim 10, wherein the thermal mitigating component is configured such that a thermal component temperature change of the thermal mitigating component is slower than the environmental temperature change of the surrounding environment.

15. The thermal insulation system of claim 14, wherein the thermal mitigating component is configured such that at least a portion of the fuel vapor received in the thermal mitigating component is condensed in the thermal mitigating component.

16. The thermal insulation system of claim 15, wherein the thermal mitigating component is configured such that the condensed fuel vapor flows back to the fuel tank.

17. The thermal insulation system of claim 14, wherein the thermal mitigating component includes a chamber with vacuum thermal insulating materials disposed on an outer surface of the chamber.

18. The thermal insulation system of claim 14, wherein the thermal mitigating component includes a chamber with insulating ceramic materials applied to an outer surface of the chamber to form a ceramic heat-insulating coating thereon.

19. The thermal insulation system of claim 14, wherein the thermal mitigating component includes a chamber with heat retention materials disposed on an outer surface of the chamber.

* * * * *